Figure 1:
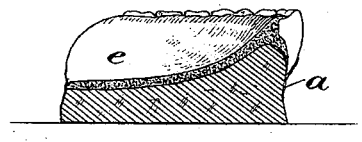

(No Model.)

M. P. BOYD.
PROCESS OF FORMING DENTAL PLATES.

No. 531,092. Patented Dec. 18, 1894.

WITNESSES:
Fred G. Dieterich
Amos W. Hart

INVENTOR
Minor P. Boyd
BY Munn & Co
ATTORNEYS.

UNITED STATES PATENT OFFICE.

MINOR P. BOYD, OF ATLANTA, GEORGIA.

PROCESS OF FORMING DENTAL PLATES.

SPECIFICATION forming part of Letters Patent No. 531,092, dated December 18, 1894.

Application filed April 2, 1894. Serial No. 506,059. (No specimens.)

*To all whom it may concern:*

Be it known that I, MINOR P. BOYD, of Atlanta, in the county of Fulton and State of Georgia, have invented a new and Improved Process of Forming Dental Plates, of which the following is a specification.

My invention consists in an improved process or method of forming continuous gums or gum surfaces on dental plates, whereby certain important advantages are attained.

The chief feature of my invention is the use of a semi-liquid plastic substance or composition in the place of rubber pieces or strips usually employed heretofore to form continuous gums.

To enable my invention to be the more readily understood, I will first state the main steps of the old or usual method of forming rubber dental plates, and then indicate, with such detail as is necessary, the points wherein my process diverges and differs therefrom.

By the old method, a plaster cast or "model" is made from an impression of a patient's mouth, and the artificial teeth are then set on wax applied to such cast or model. The model, with teeth attached, is then embedded in plaster in a suitable mold or flask, and a mold or cast obtained, in which the crown or cutting edges of the teeth appear fixed in one side of the mold, embraced by the plaster, their root portions projecting upward from one side of the mold and the process being on the other half of the mold. The wax is then removed, and strips of rubber are next applied in its place and packed over the whole surface as well as between the teeth. Vulcanization then follows, and completes the process.

My process is the same as this just described, in respect to certain preliminary steps, that is to say, up to the point of setting the teeth on the wax on the model; but I apply no wax on the outer or exterior gum side of the teeth, and even cut away any that may appear there by reason of protrusion between the teeth; and, in place of wax at that point, I apply a semi-liquid plastic composition around the entire denture. This composition may be formed of various materials, say red rubber dissolved in alcohol, ether, or any other of its liquid solvents. The consistency of the plastic may vary, and its application may be most conveniently made by means of a brush. Upon the adhesive coat of semi-liquid plastic material thus put on around the exterior gum surface of the denture, I lay a strip of red rubber, which will firmly adhere in place. I then apply a second and thicker coat of plastic material—say a solution of red rubber—over or upon the said rubber strip, and cover the latter thickly and smoothly, as required to give, as nearly as practicable, the form and appearance of the natural gum. The plastic for this second and exterior coat is made thicker than the first, chiefly in order to enable it to be more quickly applied to the requisite depth or thickness.

My invention will be more fully understood by reference to the accompanying drawings, in which—

Figure 2:
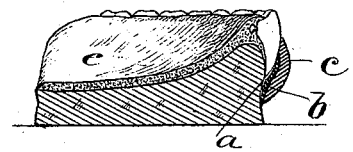
Figure 3:
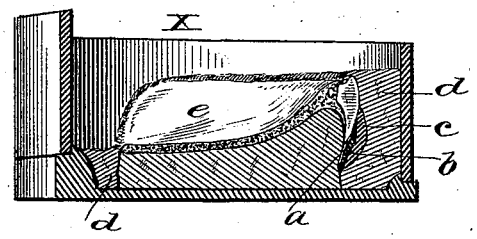
Figure 4:
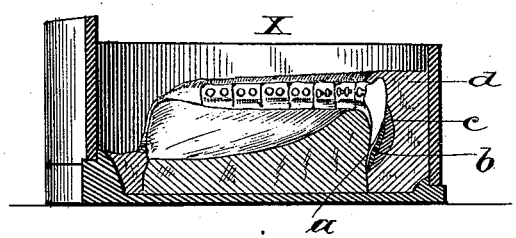
Figure 5:
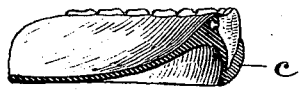

Figure 1 is a central longitudinal section of a model having wax applied on the inside (as in the old process) but not on the outer side of the denture. Fig. 2 is a view similar to Fig. 1, save that plastic is shown applied on the outer side of the denture, according to my process. Fig. 3 is a longitudinal vertical section of one portion of a flask, with the model as shown in Fig. 2 placed therein and embedded in plaster, save the inner or palatal surface which is covered with wax. Fig. 4 is a view similar to Fig. 3 save that the wax is removed from the inner or palatal surface of the model, preparatory to applying rubber in its place. Fig. 5 is a central longitudinal section of a full, completed, upper denture.

As before stated, I form a model the same as in the ordinary process, save that I apply no wax on the outer side of the denture, and likewise remove any wax that may protrude through between the roots of the teeth. Thus, at this stage, the model appears as in Fig. 1. My process virtually begins here, with the application of a thin coat, *a*, of semi-liquid plastic to the outer side of the denture, over the extremities of the roots of the teeth and on the portion of the model below and adjacent thereto. I then lay on a strip of red rubber, *b*, which readily adheres to the thin coat of plastic *a*. I next apply the plastic *c* (Fig. 2) thickly over and upon the rubber strip, so that the model assumes in form substantially the same appearance as when waxed up by the old method. The model completed as shown in Fig. 2 is then placed in the deeper portion of a flask x as shown in Fig. 3, and wet plaster d is filled in and made to surround the entire outer side of the model, and also cover the crowns of the teeth, the inner or broad palatal surface being left free. When the plaster has set, the surface of the model and plaster d surrounding it are well soaped, and a due quantity of fresh wet plaster is poured in for the purpose of obtaining a cast or mold of the embedded model, as it appears in Fig. 3. The required cast or mold being then separated from the model, the next step is to remove the wax e from the model, which being done, the model presents the appearance shown in Fig. 4, the teeth being still partly covered by plaster, d, but their pins and a portion of their inner sides being exposed. Strips or pieces of rubber are then laid in place of the wax, and the cast or mold before referred to being replaced, the flask is tightly closed and ready to be placed in the vulcanizing furnace.

I wish it understood, that I do not restrict myself in respect to the consistency of the composition, since it may vary within comparatively wide limits, without affecting the practicability of the process—that is to say, it may be quite thin or thick. I also wish it to be further understood that, while a strip of red rubber is preferably laid upon the first coat of plastic a as described, namely, to serve as an economical filling or thickening for the artificial gum, it may be dispensed with, and the entire gum formed or built up by means of the semi-liquid plastic c alone. I further state, that I do not restrict myself to any specific substance or material to form the required plastic. I have mentioned red rubber as a substance preferred on account of its availability and cheapness, but it is obvious the more expensive pink rubber may be used instead, and, in point of fact, it is to be preferred for the final or outer coat of plastic. Various other substances may also be utilized in dissolved or plastic form, for the same purpose, and this matter is therefore left to individual taste, judgment and experience.

The chief advantages of my process are, first, that the time and labor usually required for waxing up the teeth to form the exterior gum and for removing wax therefrom are saved; second, no displacement of the teeth is likely to occur as in the waxing and manipulation involved in the old proces; third, the liability of the red rubber, which forms the interior surface of a plate, to flow between the teeth and come between pieces of imperfectly packed gum, and thus intrude into the pink rubber so as to probably appear through the facing of the gum when the case is finished, is entirely avoided.

What I claim is—

1. The improved process of forming the exterior gum surface of a dental plate, which consists in setting artificial teeth on wax applied upon the inner side of a base or model and removing any wax that may protrude or adhere in the front or outer side of the denture, and then applying an adhesive liquid or semi-liquid plastic on such front or outer side of the denture, to form the continuous gum of the finished plate, substantially as described.

2. In forming a dental plate, the process of preparing a model which consists in packing it with wax on the inner or palatal side only of the base and setting the teeth on the edge of the wax, then packing the model around the front or outer side of the denture, before flasking, as shown and described.

3. The improved process of forming the exterior gum surface of a dental plate, which consists in setting artificial teeth on wax applied upon the inner or lingual side of a base or model, and removing any wax that may protrude between or adhere on the front side of the teeth, then applying a thin coat of adhesive liquid or semi-liquid plastic material around the front side of the denture, next laying a strip of soft rubber upon the coat of plastic, and finally applying a thicker coat of plastic material over the said rubber strip, thus embedding, covering and concealing it, and building up a continuous exterior gum, as shown and described.

M. P. BOYD.

Witnesses:
AMOS W. HART,
SOLON C. KEMON.